March 11, 1969 C. T. BEESON, JR., ET AL Re. 26,543
METHOD AND APPARATUS FOR BREAKING AND SEPARATING EGGS
Original Filed Oct. 25, 1963
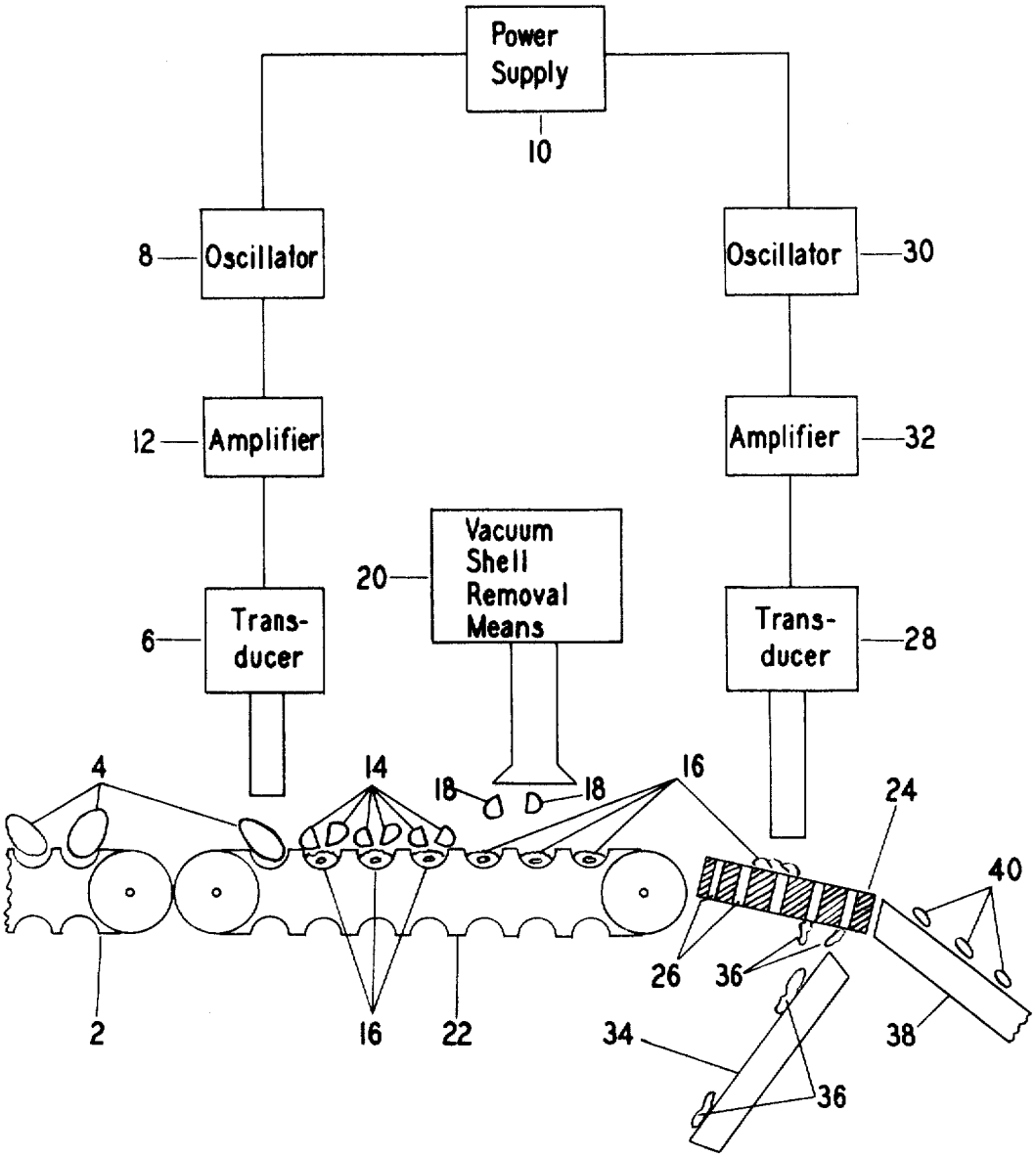
INVENTOR.
CLEMENT T. BEESON, JR.
WILLARD T. RUSSELL
WILLIS E. WEBB
Robert M. Sperry
ATTORNEY United States Patent Office Re. 26,543
Reissued Mar. 11, 1969

26,543

METHOD AND APPARATUS FOR BREAKING AND SEPARATING EGGS

Clement T. Beeson, Jr., deceased, late of Tulsa, Okla., by M'Lou Beeson, administratrix, Tulsa, Okla., and Willard T. Russell and Willis E. Webb, Tulsa, Okla.; said Russell and said Webb assignors to said M'Lou Beeson Original No. 3,207,198, dated Sept. 21, 1965, Ser. No. 319,068, Oct. 25, 1963. Application for reissue Sept. 7, 1967, Ser. No. 669,985
U.S. Cl. 146—221 21 Claims
Int. Cl. A23l *1/32;* A47j *43/14*

Matter enclosed in heavy brackets [ ] appears in the original patent but forms no part of this reissue specification; matter printed in italics indicates the additions made by reissue.

*ABSTRACT OF THE DISCLOSURE*

*A procedure for opening eggs and separating the whites from the yolks by the use of beams of radiated energy, including both a method and the apparatus for practicing the method.*

This invention relates to methods and apparatus for breaking and separating eggs and is particularly directed to novel methods and apparatus for employing ultrasonic and radio frequency techniques for breaking and separating eggs.

Within the past few years, the commercial egg industry has undergone a revolution due to the skyrocketing demand resulting from the rapidly expanding development and sales of wholly or partially prepared frozen foods, dehydrated food mixes and the like. In order to meet this increased demand, the egg industry has been forced to convert from hand operation to mechanization so that, today, the gathering, candling, crating and other coperations related to egg production are performed almost exclusively by machine. Similarly, in the utilization of eggs, there has been increasing pressure to develop methods and apparatus for breaking and separating eggs on a high speed basis and numerous attempts have been made to develop machines which could perform these operations more quickly and efficiently than has been possible with hand operation. Unfortunately, none of the machine techniques of the prior art have been entirely satisfactory. Substantially all of the prior art systems have relied upon mechanical methods and apparatus for breaking and separating eggs. However, it has been found that such apparatus requires substantial maintenance and frequently results in improper breakage or separation with the result that fragments of egg shells are frequently found in the finished product and it is necessary to closely inspect the separated whites to be certain that any traces of yolk are removed since the presence of the yolk can ruin many recipes. Moreover, while the speed attained with the devices of the prior art has been superior to hand operation, there is a great need for methods and apparatus which will further increase the speed of the breaking and separating operations.

These disadvantages of prior art methods and apparatus for breaking and separating eggs are overcome with the present invention and novel methods and apparatus for breaking and separating eggs are provided whereby the speed with which the eggs can be processed is greatly increased while the number of improperly broken or separated eggs is greatly reduced.

To obtain the advantages of the present invention, it has been found that by subjecting an unbroken egg to a beam of acoustic energy at a predetermined frequency in the ultrasonic or radio frequency range, the egg shells can be effectively "sawed" open without danger of cracking, shattering or other fragmentary breaking. Moreover, it has been found that when the egg is broken in this manner, removal of the shell from the contents, that is, the white and yolk, may be accomplished more readily and more completely than has been posssible heretofore. Similarly, once the contents have been removed, it has been found that by subjecting the contents to a beam of acoustic energy at a second predetermined frequency within the ultrasonic or radio frequency range, separation of the whites and yolks occurs and this separation is accomplished much more rapidly and completely than has been possible previously while the danger of breaking the yolks is completely eleminated.

Accordingly, is is an object of the present invention to provide novel methods and apparatus for breaking and separating eggs.

Another object of the present invention is to provide novel methods and apparatus for breaking and separating eggs by means of ultrasonic or radio frequency techniques.

A further object of the present invention is to provide novel methods and apparatus for breaking and separating eggs at high speed while reducing the number of improperly broken or separated eggs.

A specific object of the present invention is to provide a novel method of breaking and separating eggs comprising the steps of applying acoustic energy at a first predetermined frequency to an egg to cause the shell of said egg to be broken, removing the broken portions of the shell from the contents of the shell, subjecting said contents to acoustic energy at a second predetermined energy to cause the white and yolk to separate, and separately collecting said white and said yolk.

Another specific object of the present invention is to provide novel apparatus for breaking and separating eggs comprising first transducer means for applying acoustic energy at a first predetermined frequency to an egg to sever the shell of said egg, means for removing the portions of the severed shell from the contents of said shell, second transducer means for applying acoustic energy at a second predetermined frequency to said contents to cause the white and yolk to separate, means for collecting said white, and means for separately collecting said yolk.

These and other objects and features of the present invention will be apparent fromthe following detailed description taken with reference to the figures of the accompanying drawing.

In the drawing:

FIGURE 1 is a diagrammatic representation of apparatus embodying the present invention for breaking and separating eggs.

In that form of the present invention chosen for purposes of illustration in the drawing, FIG. 1 shows a conveyor 2 or the like which carries unbroken eggs 4 and supplies them to the breaking and separating apparatus. An electro-acoustic transducer 6 is positioned adjacent the conveyor 2 in such a way that the transducer 6 directs a beam of acoustic energy toward the eggs 4. The frequency of the acoustic beam transmitted by transducer 6 is determined by a suitable oscillator 8 which is energized by an appropriate power supply 10 and drives the transducer 6 through a suitable amplifier 12. It has been found that at frequencies between 700 kc. and 1000 kc. the acoustic beam will effectively "saw" the shell of the egg creating a smooth, even cut to sever the shell neatly into two parts as indicated at 14, without affecting the contents of the shell, indicated at 16. Most prior art devices have resorted to a crushing action or other mechanical method of breaking the shells and have caused rough, uneven breaks which often result in fragmentation of the shell. When this occurs, it is extremely difficult to remove all of the bits and pieces of the broken shell from the contents and, frequently such bits and pieces will be found in the finished product. This, of course, is most undesirable. In contrast, with the method of the present invention, the shell is severed but is not fragmented. Consequently, the two portions 18 of the shell may easily be removed by any suitable shell removal means, such as vacuum means 20. It is also found that the contents of the shell normally tend to adhere to the shell to a greater or lesser extent so that considerable time and difficulty has been encountered heretofore in removing all of the contents from the shell, even when the shell was not fragmented. On the other hand, the acoustic beam from transducer 6 has been found to substantially eliminate this adhesion so that all of the contents of the shell may be removed quickly and easily. Moreover, the acoustic beam from transducer 6 will "saw" the shell into two neat portions in a matter of only a few microseconds. Thus, the speed at which eggs can be moved through the breaking operation may be substantially any desired speed.

After the shell portions 14 have been removed by the shell removal means 20, the contents 16, comprising the white and yolk of the egg, are transported by suitable means, such as conveyor 22, to the separation position. At the separation position, the contents 16 are deposited on a slotted or apertured plate 24 or the like having openings, indicated at 26, through which the egg whites can pass but which are too small to allow passage of the yolks. A second electro-acoustic transducer 28 is mounted adjacent the plate 24 and serves to direct a beam of acoustic energy toward the contents 16 on the plate 24. The frequency of the acoustic beam provided by transducer 28 is determined by oscillator 30 through amplifier 32 and is preferably in the range of 300 kc. to 1000 kc. However, if desired, satisfactory results may also be obtained at frequencies in the range of 250 mc. to 1000 mc. When the contents 16 of the eggs are subjected to acoustic beams of these frequencies, it has been found that a boiling action is created within the whites of the eggs which causes the whites to dissociate from the yolks and greatly reduces the viscosity of the whites without causing any change in the nature or characteristics of the whites, such as normally occurs with the cooking or whipping of egg whites. In view of this action, the egg whites separate from the yolks and pass through the openings 26 of plate 24 to a chute 34, as indicated at 36, while the yolks are moved across plate 24 to chute 38, as indicated at 40. Chutes 34 and 38 may deliver the whites and yolks to respective storage containers, not shown, or to other appropriate receptacles. It has been found that the separation thus described occurs in only a few microseconds so that the speed of the separating operation is substantially any desired speed. Moreover, it has been found that the acoustic beam has virtually no effect on the yolks of the eggs so that the danger of breaking the yolks is completely eliminated.

Obviously, a wide variety of devices may be employed for removal of the severed shells. Moreover, other appropriate means may be substituted for the plate 24. In addition, numerous other variations and modifications may be made without departing from the present invention. Accordingly, it should be clearly understood that the form of the method and apparatus described above and shown in the figure of the accompanying drawing are illustrative only and are not intended to limit the scope of the invention.

What is claimed is:

1. Apparatus for breaking and separating eggs comprising means for supplying unbroken eggs to said apparatus to be broken and separated, first transducer means for applying acoustic energy at a first predetermined frequency to said unbroken eggs to sever the shells of said eggs, means for removing the severed shells from the contents of said shells, second transducer means applying acoustic energy to said contents at a second predetermined frequency to separate the whites from the yolks, and means for separately collecting said whites and said yolks.

2. Apparatus for breaking and separating eggs comprising means for supplying unbroken eggs to said apparatus to be broken and separated, first transducer means for applying acoustic energy having a frequency in the range of 700 kc. to 1000 kc. to said unbroken eggs to sever the shells of said eggs, means for removing the severed shells from the contents of said shells, second transducer means applying acoustic energy to said contents at a second predetermined frequency to separate the whites from the yolks, and means for separately collecting said whites and said yolks.

3. Apparatus for breaking and separating eggs comprising means for supplying unbroken eggs to said apparatus to be broken and separated, first transducer means applying acoustic energy at a first predetermined energy to said unbroken eggs to sever the shells of said eggs, means for removing the severed shells from the contents of said shells, second transducer means applying acoustic energy having a frequency in the range of 300 kc. to 1000 kc. to said contents to separate the whites from the yolks, and means for separately collecting said whites and said yolks.

4. Apparatus for breaking and separating eggs comprising means for supplying unbroken eggs to said apparatus to be broken and separated, first transducer means applying acoustic energy having a frequency in the range of 700 kc. to 1000 kc. to said unbroken eggs to sever the shells of said eggs, means for removing the severed shells from the contents of said shells, second transducer means applying acoustic energy having a frequency in the range of 300 kc. to 1000 kc. to said contents to separate the whites from the yolks, and means for separately collecting said whites and said yolks.

5. Apparatus for breaking and separating eggs comprising means for supplying unbroken eggs to said apparatus to be broken and separated, first transducer means applying acoustic energy at a first predetermined frequency to said unbroken eggs to sever the shells of said eggs, means for removing the severed shells from the contents of said shells, second transducer means applying acoustic energy having a frequency in the range of 250 mc. to 1000 mc. to said contents to separate the whites from the yolks, and means for separately collecting said whites and said yolks.

6. Apparatus for breaking eggs comprising means for supporting an egg to be broken, transducer means for applying acoustic energy having a predetermined frequency to said unbroken egg to sever the shell of said egg, and means for removing the severed shell from the contents of said shell.

7. Apparatus for breaking eggs comprising means for supporting an egg to be broken, transducer means for applying acoustic energy having a frequency in the range of 700 kc. to 1000 kc. to said unbroken egg to sever the shell of said egg, and means for removing the severed shell from the contents of said shell.

8. Apparatus for separating the contents of a broken egg, said contents including the white and yolk of said egg, said apparatus comprising transducer means applying acoustic energy having a predetermined frequency to said contents to cause said white and said yolk to separate, and means for separately collecting said white and said yolk.

9. Apparatus for separating the contents of a broken egg, said contents including the white and yolk of said egg, said apparatus comprising transducer means applying acoustic energy having a frequency in the range of 300 kc. to 1000 kc. to said contents to cause said whites to separate from said yolk, and means for separately collecting said white and said yolk.

10. Apparatus for separating the contents of a broken egg, said contents including the white and yolk of said egg, said apparatus comprising transducer means applying acoustic energy having a frequency in the range of 250 mc. to 1000 mc. to said contents to cause said white to separate from said yolk, and means for separately collecting said white and said yolk.

11. The method of breaking eggs comprising the steps of subjecting an unbroken egg to a beam of acoustic energy having a predetermined frequency to sever the shell of said egg.

12. The method of breaking eggs comprising the steps of subjecting an unbroken egg to a beam of acoustic energy having a frequency in the range of 700 kc. to 1000 kc. to sever the shell of said egg.

13. The method of separating the white of a broken egg from the yolk of said egg, said method comprising the steps of subjecting said white and said yolk to a beam of acoustic energy having a predetermined energy to cause said white to separate from said yolk.

14. The method of separating the white of a broken egg from the yolk of said egg, said method comprising the steps of subjecting said white and said yolk to a beam of acoustic energy having a frequency in the range of 300 kc. to 1000 kc. to cause said white to separate from said yolk.

15. The method of separating the white of a broken egg from the yolk of said egg, said method comprising the steps of subjecting said white and said yolk to a beam of acoustic energy having a frequency in the range of 250 mc. to 1000 mc. to cause said white to separate from said yolk.

16. The method of breaking and separating eggs comprising the steps of subjecting an unbroken egg to a first beam of acoustic energy having a first predetermined frequency to sever the shell of said egg, removing the severed shell from the contents of said shell, subjecting said contents to a second beam of acoustic energy having a second predetermined frequency to cause the white to separate from the yolk, and separately collecting said white and said yolk.

17. The method of breaking and separating eggs comprising the steps of subjecting an unbroken egg to a first beam of acoustic energy having a frequency in the range of 700 kc. to 1000 kc. to sever the shell of said egg, removing the severed shell from the contents of said shell, subjecting said contents to a second beam of acoustic energy having a frequency in the range of 300 kc. to 1000 kc. to cause the white to separate from the yolk, and separately collecting said white and said yolk.

*18. Apparatus for breaking and separating eggs, comprising means for supplying unbroken eggs to said apparatus to be broken and separated, means for applying through the air to said eggs radiated energy in the form of a first beam having qualities sufficient to sever the shells of said eggs, means for removing the severed shells from the contents of said shells, means for applying through the air to said contents radiated energy in the form of a second beam having qualities sufficient to separate the whites from the yolks, and means for separately collecting said whites and said yolks.*

*19. The method of breaking eggs, comprising the step of transmitting through the air to an unbroken egg a beam of radiated energy having qualities sufficient to sever the shell of said egg.*

*20. The method of separating the white of a broken egg from the yolk of said egg, comprising the step of transmitting through the air to said white and said yolk a beam of radiated energy having qualities sufficient to cause said white to separate from said yolk.*

*21. The method of breaking an egg and separating the contents of said egg, comprising the steps of applying to an unbroken egg, through the air, a first beam of radiated energy having qualities sufficient to sever the shell of said egg, separating the severed shell from the contents of said shell, applying to said contents, through the air, a second beam of radiated energy having qualities sufficient to cause the white to separate from the yolk, and separately collecting said white and said yolk.*

References Cited

The following references, cited by the Examiner, are of record in the patented file of this patent or the original patent.

UNITED STATES PATENTS

| | | | |
|---|---|---|---|
| 3,062,457 | 11/1962 | Willems | 241—1 |
| 3,098,495 | 7/1963 | Bush | 137—1 |
| 3,112,850 | 12/1963 | Garibotti | 225—2 |
| 3,123,546 | 3/1964 | Bodine | 208—11 |
| 3,174,044 | 3/1965 | Tien | 250—199 |

W. GRAYDON ABERCROMBIE, *Primary Examiner.*

U.S. Cl. X.R.

146—2; 241—1; 83—177